Feb. 24, 1942.  L. H. DAWSON  2,273,838
PHOTOMETER
Filed Aug. 1, 1940  4 Sheets-Sheet 1

INVENTOR
Leo H Dawson
BY
ATTORNEY

Feb. 24, 1942.                L. H. DAWSON                2,273,838
                                PHOTOMETER
                            Filed Aug. 1, 1940            4 Sheets-Sheet 2

INVENTOR
*Leo H Dawson*
BY
ATTORNEY

Feb. 24, 1942.  L. H. DAWSON  2,273,838
PHOTOMETER
Filed Aug. 1, 1940  4 Sheets-Sheet 4

INVENTOR
*Leo H Dawson*
BY
ATTORNEY

Patented Feb. 24, 1942

2,273,838

UNITED STATES PATENT OFFICE 2,273,838

PHOTOMETER

Leo H. Dawson, Washington, D. C.

Application August 1, 1940, Serial No. 349,171

5 Claims. (Cl. 88—23)

(Granted under the act of March 3, 1883, as amended April 30, 1928; 370 O. G. 757)

My invention relates to a photometer for measuring the brightness of luminous bodies in which the luminous areas are not sufficiently large to fill the optical field of conventional photometers or the brightness of the luminous areas is so low that known photometric means are wholly unsuited for accurate light measurements.

The present invention is based upon the discovery that the brightness of luminous bodies of relatively small luminous area or relatively low brightness may be accurately measured by providing a comparison field of known brightness having substantially the configuration of but a size no greater than the luminous area of the body under measurement. While my novel photometer incorporating the above principle is intended primarily for measuring the brightness of self-luminous dials and devices of the like character, it may be used for measuring the brightness of other bodies however rendered luminous or whatever the configuration of the luminous area.

Broadly stated the photometer of the present invention includes a housing having a translucent light diffusing plate forming a part thereof and a source of light serving as a working standard disposed to illuminate the side of the plate facing the housing interior. A perforated light opaque plate is adapted to cover the light diffusing plate and is provided with a perforation having substantially the configuration of and a size no greater than the luminous area of the body under measurement. The illumination of the light diffusing plate may be adjusted either by varying the intensity of the light source or by interposing a variable light transmitting instrumentality between the source and plate.

Where the above photometer is intended for portable use I have devised a compact and durable auxiliary photometer incorporating a light source serving as a reference standard for calibrating the portable photometer in view of the decrease in light intensity of the working standard thereof with use. By virtue of its compact construction the calibrating photometer is readily adapted for insertion in a compartment of the portable photometer housing to thus provide a highly convenient and practicable photometric apparatus for use in the field.

In the light of the foregoing it is among the several objects of my invention to provide a photometer for accurately measuring the brightness of luminous bodies having a relatively small luminous area or a relatively low brightness; to provide a photometer of the stated character that is portable; and to provide an auxiliary photometer of durable and compact construction for calibration purposes.

Other objects and many of the attendant advantages of this invention will be readily appreciated as the same becomes better understood by reference to the following detailed description when considered in connection with the accompanying sheets of drawings wherein.

Figure 1:
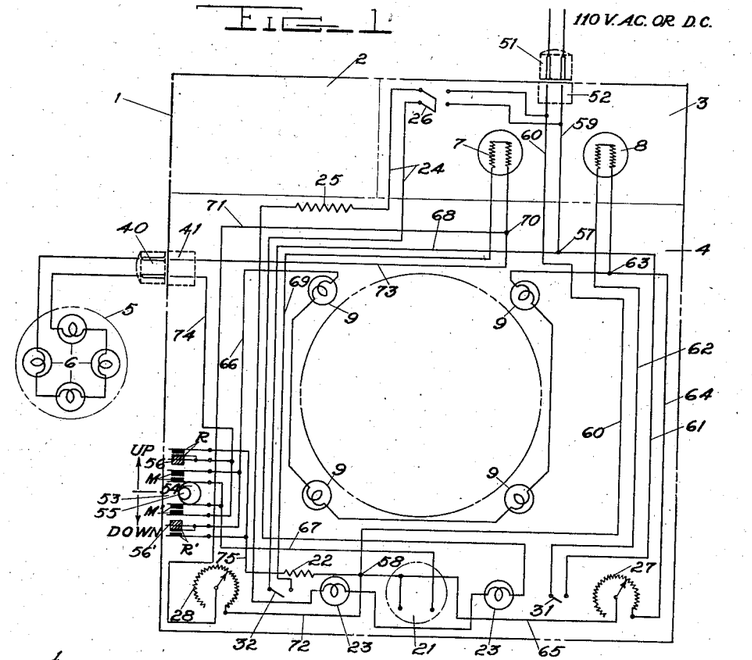
Fig. 1 is a diagrammatic plan view of one embodiment of the present invention showing a portable photometer and its associated calibrating photometer together with their electrical circuits.
Figure 2:
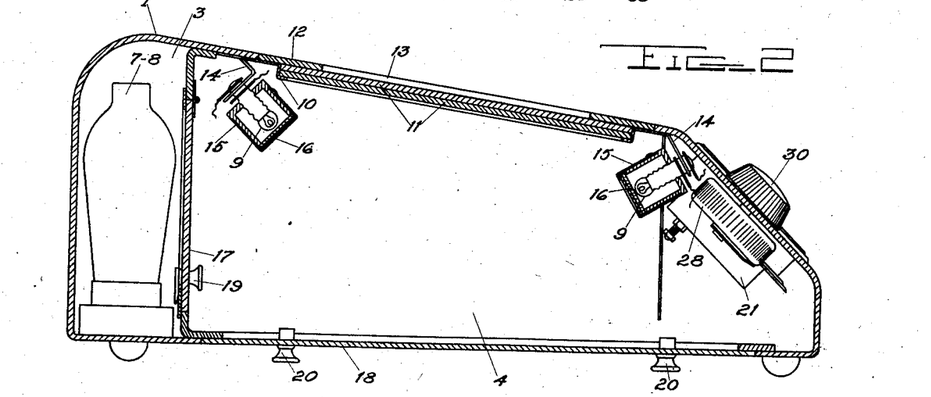
Fig. 2 is a sectional view in side elevation taken on the line 2—2 of Fig. 3 depicting certain of the structural details of the portable photometer of Fig. 1 with the perforated light opaque plate and the light diffusing plate in superposed relation.
Figure 3:
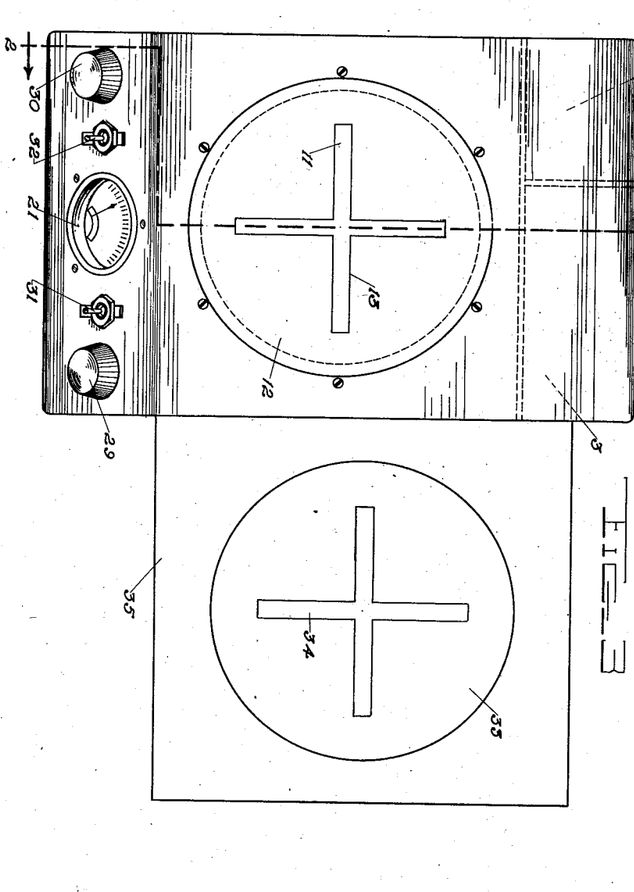
Fig. 3 is a plan view of the portable photometer showing the luminous body under measurement supported in juxtaposed and substantially coplanar relation with respect to the perforated plate.

Turning now to the drawings, there is disclosed in Figs. 1 to 3 thereof the housing of the portable photometer identified in general by the reference character 1 and divided into three compartments numbered 2, 3 and 4 respectively. Compartment 2 accommodates the calibrating photometer 5 when it is not in use. As indicated schematically in Fig. 1 the calibrating photometer 5 includes a source of light serving as a reference standard which, for illustrative purposes, is shown as comprised of four electric incandescent lamps 6. Compartment 3 contains the ballast tubes 7 and 8 for maintaining any selected current through the working standard 9 and the reference standard 6 of the respective portable and calibrating photometers substantially constant attending any voltage fluctuations of the current mains. The ballast tubes 7 and 8 may be of any conventional design and as shown include a ballast resistor enclosed in a suitable envelope provided with an appropriate gaseous filling. By use of the ballast tubes any commercial source of alternating and direct current voltage may be employed for energizing the working and reference standards of the photometric apparatus.

A cylindrical flanged apertured member 10 (Fig. 2) is shown by way of illustration secured to the upper wall of the housing compartment 4 for supporting one or more translucent light diffusing plates 11 and a perforated light opaque plate 12 in superposed relation. The light diffusing and light opaque plates may be fabricated of any suitable material and may be other than disc shaped if desired. The light opaque plate 12 is removable from and covers all portions of the light diffusing plates 11 except those visible through its perforation 13.

A source of light which serves as the working standard is disposed to illuminate the side of the translucent plate 11 facing the housing interior and is shown purely by way of example as comprised of the four electric incandescent lamps 9 hereinbefore noted supported in an insulating manner from the housing wall by suitable brackets 14. Each of the lamp bases has in threaded engagement therewith a light-tight enclosure 15 provided with a removable optical filter 16 for matching the light illuminating the plate 11 with that from the luminous body under measurement where the lamps and the luminous body differ somewhat in their spectral characteristics. The inner walls of the compartment 4 have good reflecting qualities and project the light from the lamps 9 incident thereupon onto the translucent plates 11 to provide a uniformly illuminated field. Hinged panels 17 and 18 allow access to the compartments 3 and 4 when desired and are held in their normally closed positions by their respective pivotally mounted latch members 19 and 20.

A suitable current meter 21 connected with a resistor 22 (Fig. 1) having a resistance substantially equal to that of the meter indicates the current energizing either the reference or working standards 6 and 9 and is mounted on the housing 1 to be readily visible from the exterior thereof. In order that the meter may be read without difficulty when the photometer is placed in a dark room for measuring the brightness of luminous bodies, the face of the meter 21 is illuminated by red light from two series connected miniature electric lamps 23 (Fig. 1) in circuit with the conductors 24 and current limiting resistor 25 and energizable from the current mains upon closure of the switch 26. Variable resistors 27 and 28 adjustable by their respective control knobs 29 and 30 serve to vary the current through, and hence the intensity of, the working standard 9 and reference standard 6 respectively. The circuits energizing the working standard 9 and the reference standard 6 are arranged to be closed and interrupted by the switches 31 and 32 respectively.

The body under measurement is shown in Fig. 3, for purposes of illustration, as a dial 33 provided with a cross 34 rendered self-luminous by the well-known use of radioactive material. The luminous area of the body under measurement may of course have any desired configuration, either fanciful or indicial, and need not be self-luminous, as previously noted herein. The luminous dial 33 is preferably supported in juxtaposed and substantially coplanar relation with respect to the perforated light opaque plate 12 by the laterally extending platform 35 secured to the photometer housing 1.

The coplanar disposition of the dial 33 increases the accuracy of measurement but is not deemed essential since sufficiently accurate measurements may be obtained by dispensing with the platform 35 and by placing the dial adjacent the photometer upon the surface supporting the same. The perforation 13 of the light opaque plate 12 has the same configuration and size as that of the luminous area 34 of the body under measurement. While the size of the perforation 13 may not exceed that of the luminous area 34 it may be somewhat smaller than this area if the luminous area is raised from adjacent parts of the body 33. That it should be clear that the perforation of the light opaque plate always has a configuration or design identical with that of the luminous body area under measurement and a size never greater than the luminous body area but at times permissibly smaller.

Figure 4:
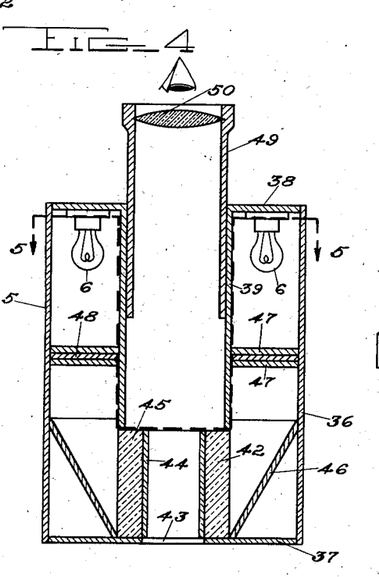
Fig. 4 is a sectional view in side elevation taken on the line 4—4 of Fig. 5 disclosing the structural details of the calibrating photometer of Fig. 1.
Figure 5:
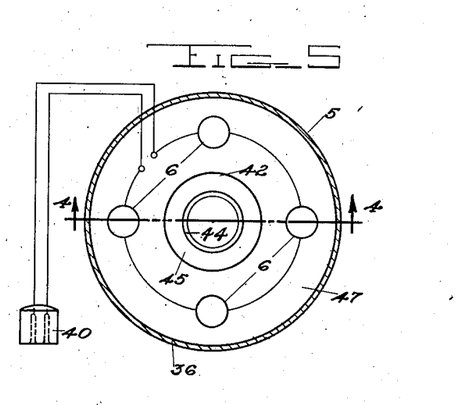
Fig. 5 is a plan view in section of the calibrating photometer taken on the line 5—5 of Fig. 4.

Before describing the electrical circuits of Fig. 1 or the calibration and use of the portable photometer, the construction of the calibrating or auxiliary photometer 5 will be first detailed. As shown in Figs. 4 and 5 of the drawings, the calibrating photometer includes a cylindrical casing 36 having an apertured plate 37 at one end of the casing and a plate 38 provided with a reentrant cylindrical extension 39 at the other end thereof. The plate 38 is removably secured to the casing in any suitable manner and supports the electric lamps 6 which serve as the reference standard. These lamps are shown placed in series relation and connected to a plug 40 adapted for insertion in the socket 41 (Fig. 1) of the photometer housing 1.

An annular light pervious member 42 fabricated of any proper material is disposed and securely held intermediate the apertured plate 37 and the free end of the cylindrical extension 39 to provide juxtaposed fields with the light from the lamps 6 and that introduced through the plate aperture 43. To the achievement of this end the light pervious member 42 is provided with a thin light opaque coating 44 along its entire inner cylindrical surface leaving only the terminal surface 45 thereof free to transmit light from the lamps which is visible to the observer as an annular diffuse field.

An inverted frusto-conical reflector 46 projects any light from the lamps 6 incident thereupon into the light pervious member 42 through the outer cylindrical surface thereof. Substantially uniform illumination of the reflector 46 is achieved by positioning one or more annular light diffusing translucent plates 47 intermediate the lamps 6 and the reflector 46. Where the light from the lamps and that entering the aperture 43 of the plate 37 differ somewhat in their spectral characteristics an annular optical filter 48 may be optionally employed to obtain a light match. The annular diffusing plates 47 and filter 48 may be removably secured to the plate extension 39 in any suitable manner.

An adjustable tube 49 in alignment with the plate aperture 43 is slidably mounted in the cylindrical plate extension 39 and supports a suitable lens 50 for facilitating the viewing of the juxtaposed light fields. By disposing the light source 6 intermediate the tubular plate extension 39 and the casing 36 and arranging the other essential elements of the photometer in the manner described, there is provided a mechanically strong, compact and durable structure which may be conveniently inserted in the compartment 2 of the portable photometer housing 1 when not in use.

The electrical circuits for variably energizing the working and reference standards 6 and 9 of the portable and calibrating photometers are shown for illustrative purposes in Fig. 1 as including a series-parallel circuit for each standard, both circuits being arranged for energization by a common source of voltage (not shown) connected to a plug 51 adapted for insertion in the socket 52 of the photometer housing 1. The series branch of each circuit includes one of the ballast tubes 7, 8 and the remaining branch thereof one of the standards 6, 9 and one of the variable resistors 27, 28 in parallel therewith. A multiple switch, identified in general by the reference character 53, is associated with the two series-parallel circuits and interchangeably connects the current meter 21 and its resistor 22 in the parallel branches thereof to thus indicate the current energizing either of the standards 6 and 9.

The multiple switch 53 includes an upper and lower pair of resilient blade switches, the upper switch pair being provided with engageable contacts M and R and the lower switch pair with the engageable contacts M' and R'. The blade switches of each pair are together moved into contact engaging position to the exclusion of the other pair by the eccentrically mounted insulated cam 54 actuated by the control knob 55 which is readily accessible to the operator of the instrument. Insulating abutments 56, 56' secured to two of the switch blades electrically insulate the switch contacts M, R and M', R' from each other when they are electrically engaged, since one switch of each pair connects the working standard 9 in circuit while the remaining switch thereof places the reference standard 6 in circuit.

In order that the precise circuit connections may be better understood the series-parallel circuits for energizing the working and reference standards 6 and 9 will be described in detail when the eccentric cam 54 of the multiple switch is moved to its up position to cause an engagement of the switch contacts M and R. The two series-parallel circuits, it is to be noted, are connected at the junction points 57 and 58 to the source of voltage by the conductors 59 and 60 for multiple energization.

The series-parallel circuit for energizing the working standard 9 extends from one side of the current mains by the conductor 59 to the junction point 57, from whence through the conductor 61 to the circuit switch 31 and continues from the switch by the conductor 62 through the ballast tube 8 to the junction point 63. The foregoing constitutes the series branch of the series-parallel circuit for energizing the reference standard 9.

The parallel branch of the circuit extends between the junction points 63 and 58 and comprises two arms one of which includes the variable resistor 27 and the other the working standard 9 and current meter 21 in series therewith. The arm including the variable resistor 27 extends from the junction point 63 by the conductor 64 to the variable resistor 27 and from thence through the conductor 65 to the junction point 58. The other arm of the parallel branch extends from the junction point 63 through the working standard 9 and conductor 66 to the switch contacts M of the multiple switch 53. The circuit continues from the contacts M through the conductor 67 and meter 21 to the junction point 58.

The series-parallel circuit above described is completed to the other side of the current mains by the conductor 60. It should be clear from the foregoing that the current through the working standard 9 will be indicated by the current meter 21 and that it may be varied by adjusting the variable resistor 27. The brightness of the diffusing plates 11 in consequence thereof may be controlled at will.

The series-parallel circuit for energizing the reference standard 6 likewise extends from one side of the current mains by the conductor 59 to the junction point 57, from thence through the conductor 68 to the switch 32 and continues from this switch by the conductor 69 through the ballast tube 7 to the junction point 70. The foregoing circuit connections constitute the series branch of the series-parallel circuit energizing the reference standard 6.

The parallel branch of this circuit extends between the junction points 70 and 58 and likewise comprises two arms one of which includes the variable resistor 28 and the other the reference standard 6 and fixed resistor 22 in series therewith. The arm of the parallel branch containing the variable resistor extends from the junction point 70 by means of the conductor 71 to the variable resistor 28 and from thence through the conductor 72 to the junction point 58. The remaining arm of the parallel branch including the reference standard 6 and fixed resistor 22 extends from the junction point 70 through the conductor 73 to the reference standard 6 and from thence by the conductor 74 to the contacts R of the multiple switch 53. The circuit continues from the contacts R by the conductor 75 to the fixed resistor 22 and from thence to the junction point 58.

The series-parallel circuit for energizing the reference standard 6 as in the case of the other series-parallel circuit previously described is completed to the other side of the current mains by the conductor 60 connected to the junction point 58. It should thus be clear that the current through the reference standard 6 may be varied by adjusting the variable resistor 28 and that the brightness of its comparison field 45 (Fig. 5) may be controlled at will.

By moving the eccentric cam 54 of the multiple switch 53 to its down position the contacts M and R of the upper switch pair are disengaged and the contacts M' and R' of the lower switch pair are now engaged. The movement of the multiple switch as above indicated has only the effect of interchanging the current meter 21 and fixed resistor 22 in the parallel branches of the series-parallel circuits so that the current meter 21 is now in series with the reference standard 6 for indicating the current therethrough while the fixed resistor 22 is now in series with the working standard 9. It should be carefully noted that the interchange of the current meter 21 and resistor 22 is unaccompanied by any current change in either of the two series-parallel circuits, since the resistor 22 has a resistance value substantially equal to that of the meter 21. In consequence of the foregoing, if the diffusing plates 11 (Fig. 2) of the portable photometer and the comparison field 45 (Fig. 5) of the calibrating photometer are adjusted for equality of brightness, the movement of the multiple switch 53 from one closed position to another will in nowise impair the established brightness equality.

In order that the foregoing may be clear when the multiple switch is in its down position, it will be observed that the parallel circuit arm including the working standard 9 extends from the junction point 63 through the working standard 9 and conductor 66 to the engaged contacts R' and from thence through the conductor 75 and fixed resistor 22 to the joint point 58. Thus it is evident that the working standard 9 is now in series with the fixed resistor 22. The parallel circuit arm including the reference standard 6, on the other hand, extends from the junction point 70 through the conductor 73, reference standard 6 and conductor 74 to the engaged contacts M' and continues from thence through the conductor 67 and current meter 21 to the junction point 58. The reference standard 6 and current meter 21 are now series connected so that the current energizing this standard may be readily ascertained.

Due to the decrease in brightness of the working standard 9 with use, the calibration of the portable photometer will remain constant over a limited time only. In order that the brightness of the diffusing plates 11 may be periodically calibrated in terms of the current through the working standard 9, as indicated by the meter 21, the auxiliary photometer 5 incorporating the reference standard 6 is provided, which is used only for calibrating purposes. The brightness of the comparison field 45 of the auxiliary photometer 5 is first calibrated in the laboratory throughout the desired working range in terms of the current through the reference standard 6 as indicated by the meter 21. The auxiliary photometer will keep this calibration for long periods of time because of its infrequent use.

In calibrating the portable photometer the perforated light opaque plate 12 is first removed and the auxiliary photometer then placed with its aperture plate 37 on the light diffusing plates 11. Assuming the multiple switch 53 to be in its up position and all other switches of the photometer circuits to be closed, the variable resistor 27 is adjusted to a certain setting by manipulation of the control knob 29 to give a desired but unknown brightness of the light diffusing plates 11. The current energizing the working standard 9 as indicated by the meter 21 is noted and recorded.

With the eye placed at the lens supporting tube 49 of the auxiliary photometer 5 the variable resistor 28 is adjusted by manipulation of the control knob 30 until the comparison field 45 of the auxiliary photometer assumes a brightness equal to that of the field of the diffusing plates 11. The multiple switch 53 is now moved from its up position to its down position, causing an interchange of the current meter 21 and fixed resistor 22 in the series-parallel circuits, as previously described herein. The current through the meter 21 is now the current energizing the reference standard 6. Since the brightness of the comparison field 45 in terms of the current energizing the reference standard 6 is known, the brightness of the diffusing plates 11 in terms of the current energizing the working standard 9 may be immediately deduced. By repeating the foregoing procedure throughout the desired working range the brightness of the diffusing plates 11 in terms of the current energizing the working standard 9 as indicated by the meter 21 is known. Upon completion of the calibration, the multiple switch 53 is moved to its up position and the auxiliary photometer circuit deenergized preparatory to the measurement of the brightness of the luminous bodies. Upon the removal of the auxiliary photometer 5 from the light diffusing plates 11 and the replacement of the perforated light opaque plate 12, the portable photometer is now ready for use.

With the perforated light opaque plate 12 and the luminous dial 33 arranged as indicated in Fig. 3 the portable photometer is carried into a dark room. When the observer's eyes are properly accommodated, the variable resistor 27 is adjusted by manipulation of the control knob 29 until equality of brightness is established between the light diffusing field of the plates 11 as viewed through the perforation 13 of the disc 12 and the luminous area 34 of the body under test. When this match has been obtained the reading of the current meter 21 is noted and the brightness of the dial 33 is immediately determined by reference to the previously established calibration.

Figure 10:
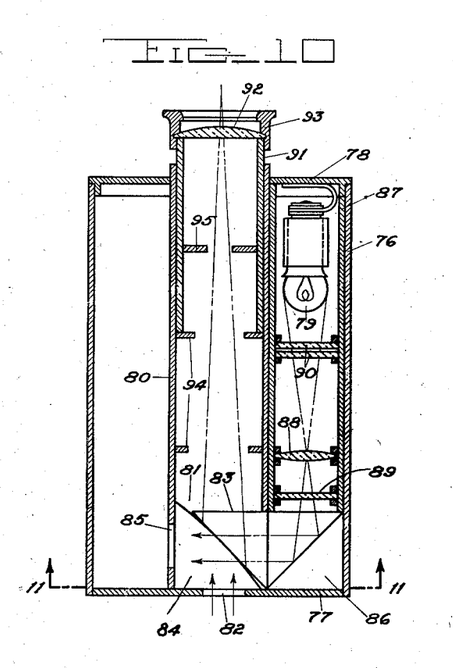
Fig. 10 is a longitudinal sectional view of a still further embodiment of the calibrating photometer.
Figure 11:
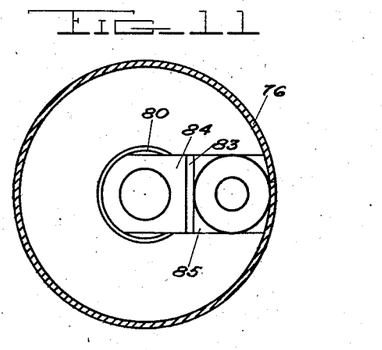
Fig. 11 is a sectional view of this photometer taken on the line 11—11 of Fig. 10.

In Figs. 10 and 11 of the drawings there is shown an alternative embodiment of the calibrating photometer which may be advantageously used in place of the one indicated in Fig. 1. This photometer includes a cylindrical casing 76 having an apertured plate 77 at one end of the casing and another plate 78 removably associated with the other end thereof. The plate 78 supports in a suitable manner an electric incandescent lamp 79 which serves as a reference standard and which may be connected with conductors and a plug capable of being inserted in the socket 41 of the photometer housing (Fig. 1). Cylindrical member 80 extends inwardly of the casing from the plate 78 and supports at its lower end a conventional Lummer-Brodhun cube identified in general by the reference character 81. The cube 81 is associated with the apertured plate 77 and the lower end of the cylindrical member 80 to provide juxtaposed fields with the light from the lamp and that introduced through the plate aperture 82.

As shown in the drawings, the Lummer-Brodhun cube 81 is comprised of two right angle prisms 83 and 84 held in intimate contact at their oblique faces over an elliptical area only, this being accomplished by grinding the oblique face off of the prism 84 slightly spherical except for a central elliptical portion thereof which is left optically flat. The two prisms 83 and 84 of the Lummer-Brodhun cube at their elliptical interface thus become optically homogeneous permitting passage of the light from one prism to another through the interface without diminution or reflection. Thus any light introduced through the aperture 82 of the plate in line with the elliptical interface passes through the cube 81 and is visible to the observer as a circular field while any light through this aperture outside of the elliptical interface is reflected from the oblique face of the prism 83 through the opening 85 of the cylindrical member 80. Likewise, any light from the lamp 79 entering the cube 81 in line with the elliptical interface passes through the cube and opening 85 of the cylindrical member 80 while any light outside of this interface is reflected from the oblique surface of the prism 83 to be visible by the observer as a circumscribed juxtaposed comparison field.

A right angle reflecting prism 86 is disposed within the casing 76 for projecting any light from the lamp 79 incident thereupon into the Lummer-Brodhun cube 81. A tubular member 87 in alignment with the lamp 79 and reflecting prism 86 holds a suitable lens 88 with the lamp at its focal point and a translucent light diffusing plate 89. Optical filters 90 may be optionally disposed within the tubular member 87 to obtain a light match when the light from the lamp 79 and that entering the aperture 82 of the lower plate differ somewhat in their spectral compositions. A tube 91 is adjustably and slidably mounted in the upper end of the cylindrical member 80 and supports a suitable lens 92 held in place by the eye piece 93 for bringing the juxtaposed light fields into sharp focus. Diaphragms 94 and 95 may be arranged in the cylindrical member 80 and the tube 91 to prevent any scattered light from entering the eye.

By disposing the light source 79 intermediate the cylindrical member 80 and the casing 76 and arranging the other essential elements of the photometer in the manner described, there is provided a mechanically rugged and compact structure that may be conveniently inserted in the compartment 2 of the photometer housing 1 (Fig. 1) when not in use. The auxiliary photometer of Fig. 10 is employed in a manner identical with that of Fig. 4 when calibrating the light diffusing plates 11 of the portable photometer.

Turning now to Figs. 6 to 9 of the drawings, there is disclosed therein a still further embodiment of the photometer of the present invention for measuring the brightness of luminous bodies in which a plurality of relatively movable apertured rotatable discs is employed for varying the illumination and hence the brightness of the light diffusing plates. This photometer includes a housing 96 of any convenient shape having one or more translucent light diffusing plates 97 suitably secured at one end thereof. A perforated light opaque plate 98 is held in removable and superposed relation on the diffusing plates 97 by the pivotally mounted retaining members 99 and covers the light diffusing plates 97 except those portions visible through its perforation. The perforation of the light opaque plate 98 has substantially the configuration of and a size no greater than the luminous area of the body under measurement, all as pointed out previously herein.

Figure 6:
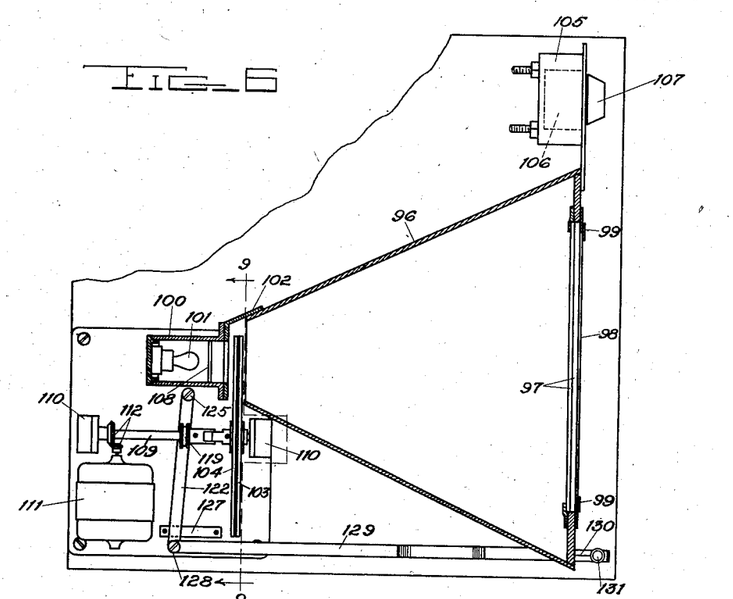
Fig. 6 is a plan view partly in section of another embodiment of the photometer of the present invention for measuring the brightness of luminous bodies in which a plurality of relatively movable apertured rotatable discs is employed for varying illumination of the light diffusing plate.

A light-tight enclosure 100 contains an electric incandescent lamp 101 serving as the working standard, the lamp being disposed to illuminate the side of the diffusing plate 97 facing the housing interior. The light-tight enclosure is supported from the open end of the housing 96 by a suitable bracket 102 in such a manner that the rotatable discs 103 and 104 may be freely interposed between the light source 101 and the diffusing plates 97. The lamp 101 is connected in circuit with the current meter 105 and the variable resistor 106 controlled by the knob 107; and an optical filter 108 may be optionally associated with the lamp to obtain a light match where the light from the lamp and that from the luminous body under measurement have somewhat different spectral characteristics.

Figure 9:
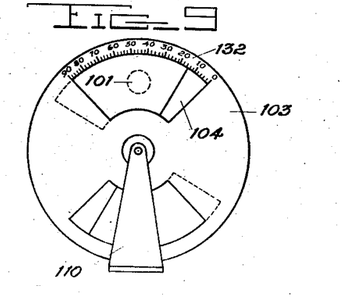
Fig. 9 is a view in side elevation taken on the line 9—9 of Fig. 6 showing the apertured disc construction.

The discs 103 and 104 are mounted to rotate with the shaft 109 which, for this purpose, is rotatably supported at its ends on the uprights 110 and is driven by the variable speed motor 111 through the intermeshing gears 112. The discs 103 and 104, as clearly indicated in Fig. 9, are similarly apertured, each of the apertures being shown for illustrative purposes as extending over an arc of 90°. The number of apertures in each disc is not critical, it being evident, however, that the composite opening may be varied by moving the discs 103 and 104 relatively to each other. The discs as shown interposed between the light source 101 and the light diffusing plates 97 alternately intercept and transmit light, the transmission ratio being varied by adjusting the size of the composite opening. Above the flicker frequency the intensity of the light passing through the rotating sectored disc structure is directly proportional to the composite disc opening. By varying this opening the illumination and hence the brightness of the diffusing plates 97 may be adjusted.

Figure 7:
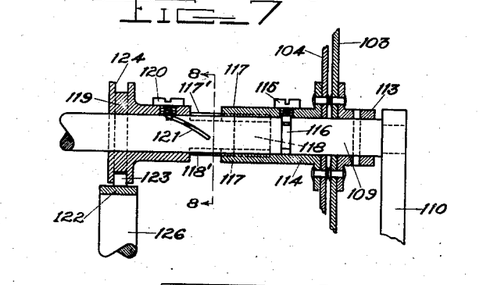
Fig. 7 is a detail partly in section showing the manner of mounting the rotatable discs and the means for achieving a relative adjustment thereof during rotation.
Figure 8:
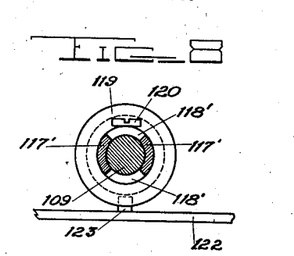
Fig. 8 is a sectional view taken on the line 8—8 of Fig. 7 disclosing certain features of the disc adjusting means in greater detail.

In order that it may be understood how the discs 103 and 104 are adjusted relatively to each other to vary the composite opening therethrough during the rotation thereof, reference is made to Figs. 7 and 8. From an examination of these figures it will be observed that the disc 103 is secured to a flanged sleeve 113 rigidly fixed to the shaft 109; and that the disc 104 is also secured to a flanged sleeve 114 which, however, is rotatable on the shaft and held in a fixed and invariable position with respect to the sleeve 113 by the pin 115 engaging the groove 116 of the shaft. The sleeve 114 is provided with a pair of projections 117 and a pair of recesses 118 which slidably engage complementary recesses 118' and projections 117' respectively of the flange peripherally recessed sleeve 119. The sleeve 119 rotates with the shaft 109 but is capable of longitudinal and circumferential adjustment with respect to the shaft by virtue of the pin 120 slidably engaging a spiral groove 121 in the shaft. It is thus clear that if the sleeve 119 is adjusted longitudinally of the shaft 109 its concurrent circumferential displacement relative to the shaft will cause a like displacement of the sleeve 114 and the disc 104 secured thereto by reason of the sliding engagement between the sleeve 114 and 119 heretofore described. By this arrangement discs 103 and 104 are relatively displaced to vary the composite opening therethrough. The invariable spacing of the discs 103 and 104 allows the light-tight enclosure 100 to be mounted close to the open end of the housing 96 thereby providing a compact construction and minimizing any stray light losses, thus further increasing the accuracy of measurement.

In order to impart longitudinal movement to the flanged sleeve 119 a link 122 is provided with a pin 123 which continuously engages the circumferential recess 124 in the sleeve 119. The link 122 is pivoted at 125 in any suitable manner on the upright 126 and adjacent its free end is in frictional engagement with the plate 127 mounted on uprights (not shown) but similar to upright 126. The link 122 is pivotally secured at 128 to the link 129 which has the outer portion thereof bent downwardly from the uprights to engage the photometer base and clear the housing 96. The link 129 is longitudinally apertured at 130 adjacent its terminal portion and has extending therethrough into the photometer base the knurled screw 131 for releasably locking the link 129 in any of its adjusted positions. It should be clear from the foregoing that the discs 103 and 104 may be adjusted relatively to each other during their rotation by means of the previously described linkage.

Since the intensity of the working standard 101 decreases with use it becomes necessary to periodically calibrate the photometer before using it for the brightness measurement of luminous bodies. This is accomplished by first removing the perforated light opaque plate 98 and then immobilizing the discs 103 and 104 so that the light from the lamp may pass through the apertures thereof in an unimpeded fashion to illuminate the light diffusing plates 97. The variable resistor 106 is then adjusted by the knob 107 to provide a light emission from the lamp 101 of relatively high intensity. The current energizing the lamp at this intensity may then be observed by noting the reading of the current meter 105. The brightness of the plates 97 is then measured by means of any commercial photometer so that the brightness of the plates in terms of the current energizing the working standard is known. This measurement, being at a relatively high brightness value, can be made with a high degree of accuracy.

The perforated light opaque plate 98 is now placed over the diffusing plates 97 and is there held in fixed position by the retaining members 99. The luminous body, which may be a radioactive dial such as indicated in Fig. 3 of the drawings, is placed adjacent the light opaque plate 98 in a dark room. The discs 103 and 104 are now set in motion by energizing the motor 111 and the brightness of the diffusing plates 97 is varied during the disc rotation by adjusting the composite disc opening through the manipulation of the link 129. In so doing the rotative speed of the discs is kept above the flicker frequency by adjusting the speed of the motor 111. When equality of brightness is established between the light diffusing plates 97 as viewed through the perforation of the light opaque plate 98 and the luminous area of the body under measurement, the rotatable discs 103 and 104 may be stopped and the composite opening therethrough determined from a reading of the angular scale 132 on the disc 103. Since the intensity of the light passing through the rotating sectored discs is directly proportional to the opening therethrough, the brightness of the diffusing plates 97 for the adjusted composite opening can be determined. Thus, the brightness of the luminous dial is made known. The scale 132 (Fig. 9) may alternatively be graduated directly in proportional brightness values or the terminal portion of the link 129 could be graduated in proportional brightness values and the brightness of the diffusing plates 97 determined without stopping the rotating discs.

According to the provisions of the patent statutes I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A photometer comprising in combination a cylindrical casing, an apertured plate at one end of said casing and a plate provided with a reentrant cylindrical extension at the other end thereof, an electric lamp mounted on the second mentioned plate and within the casing, means disposed intermediate the apertured plate and the free end of the cylindrical extension to provide juxtaposed fields with the light from the lamp and that introduced through the plate aperture, an inverted frusto-conical reflector within said casing for projecting any light from the lamp incident thereupon into the said means, an annular light diffusing translucent plate intermediate the lamp and reflector and an adjustable lens supporting tube slidably mounted in the cylindrical plate extension for viewing the juxtaposed light fields.

2. A photometer comprising in combination a casing, an apertured plate at one end of said casing and a plate provided with a reentrant extension at the other end thereof, a light source within said casing, an apertured cylindrical member light pervious in part disposed intermediate the apertured plate and the free end of the plate extension to provide juxtaposed fields with the light from the source and that introduced through the plate aperture, means for projecting any light from said source into the light pervious member, and means in alignment with the plate extension for viewing the juxtaposed light fields.

3. A photometer comprising in combination a housing having an apertured plate at one end thereof, a light source disposed within said housing, means associated with said source and apertured plate for producing juxtaposed fields with the light from the source and that introduced through the plate aperture, the said means including an apertured cylindrical member light pervious in part into the periphery of which any light from the source is projected, and means in alignment with the aperture of the housing plate for viewing the juxtaposed light fields.

4. A photometer comprising in combination a cylindrical casing, an apertured plate at one end of said casing and another plate at the other end thereof, a cylindrical member extending inwardly of the casing from the second mentioned plate, an electric lamp mounted on the second mentioned plate and within the casing, a Lummer-Brodhun cube associated with the apertured plate and the lower end of the cylindrical member to provide juxtaposed fields with the light from the lamp and that introduced through the plate aperture, a reflecting prism within said casing for projecting any light from the lamp incident thereupon to the Lummer-Brodhun cube, a light diffusing translucent plate intermediate the lamp and prism and an adjustable lens supporting tube slidably mounted in the upper end of the cylindrical member for viewing the juxtaposed light fields.

5. A photometer comprising in combination a casing, an apertured plate at one end of said casing and another plate at the other end thereof, a tubular member extending inwardly of the casing from the second-mentioned plate, a light source disposed intermediate the casing and the tubular member and arranged to project light lengthwise of the member, means contacting the apertured plate and the lower end of the tubular member for providing juxtaposed fields with the light from the source and that introduced through the plate aperture, and means for projecting any light from said source directed lengthwise of the tubular member to the first-mentioned means.

LEO H. DAWSON.